(12) United States Patent
Kurihara

(10) Patent No.: US 6,325,183 B2
(45) Date of Patent: Dec. 4, 2001

(54) BRAKE CABLE MOUNTING STRUCTURE FOR A DRUM BRAKE

(75) Inventor: Katsuhisa Kurihara, Nagoya (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/727,467

(22) Filed: Dec. 4, 2000

(30) Foreign Application Priority Data

Dec. 14, 1999 (JP) ................................. 11-355162

(51) Int. Cl.[7] ...................................................... F16D 65/09
(52) U.S. Cl. ..................... 188/78; 188/106 P; 188/106 F
(58) Field of Search ................... 188/78, 106 A, 188/106 F, 106 P, 325, 329, 330

(56) References Cited

U.S. PATENT DOCUMENTS

| | | | | |
|---|---|---|---|---|
| 3,823,799 | * | 7/1974 | Margetts ................................. | 188/78 |
| 3,991,861 | * | 11/1976 | Hayashida ........................ | 188/106 A |
| 5,322,145 | * | 6/1994 | Evans ................................. | 188/106 F |
| 5,529,149 | * | 6/1996 | Johannesen et al. ............. | 188/106 F |

FOREIGN PATENT DOCUMENTS

| | | |
|---|---|---|
| 3428134 | 2/1986 | (DE) . |
| 4327557 | 2/1995 | (DE) . |
| 2162602 | 2/1986 | (GB) . |
| 6337027 | 12/1994 | (JP) . |

* cited by examiner

Primary Examiner—Chris Schwartz
(74) Attorney, Agent, or Firm—Liniak, Berenato, Longacre & White

(57) ABSTRACT

A brake cable mounting structure for a drum brake which, even if the distance from the brake mounting surface to the brake shoe center in the width direction is short, secures an effective stroke of the brake cable, facilitates the layout of the brake cable mounting section and the crank mechanism, and reducing the size of the anchor by only needing to support the brake force. To that end, a brake cable mounting structure for a drum brake is provided, wherein the pipe-like section, in which the outer casing of the brake cable is attached, is formed integrally with the spacer positioned between a part of the back plate around the anchor which supports one adjacent ends of the pair of brake shoes and the brake mounting member.

6 Claims, 10 Drawing Sheets

BRAKE CABLE MOUNTING STRUCTURE FOR A DRUM BRAKE

BACKGROUND OF INVENTION

1. Field of the Invention

This invention relates to a brake cable mounting structure suitable for a drum brake structure for a rear wheel. More specifically, this invention relates to a brake cable mounting structure which has a crank mechanism spreading a pair of brake shoes apart and is capable of operating the crank mechanism remotely.

2. Description of Related Art

For example, the brake cable mounting structure for the drum brake is disclosed in the Japanese Patent Application Unexamined Publication Number 6-337027 filed by this applicant. FIGS. 7–10 explain a drum brake device employing this brake cable mounting structure. A pair of brake shoes 110, 120 are moveably mounted on a back plate 100 by shoe hold mechanisms 111, 121. In FIG. 7, lower adjacent ends of the brake shoes 110, 120 are supported by a supporting portion 201 of an almost L-shaped anchor 200 while upper adjacent ends of the brake shoes 110, 120 are connected via an adjuster 130. An upper shoe return spring 160 is extended between the upper adjacent ends of the brake shoes 110, 120 and a lower shoe return spring 160 is extended between the lower adjacent ends of the brake shoes 110, 120, maintaining the abutment of the two brake shoes 110, 120 against the adjuster 130 and the anchor 200.

A crank mechanism 300 comprises a brake lever 320, a strut 330 and a lever pin 310. The crank mechanism 300 is positioned adjacent to the supporting portion 201 of the anchor 200 between the two brake shoes 110, 120. The brake lever 320 comprises two facing long plates. A notched groove 321 formed at the superimposing portion on the right side of the plates in FIG. 8 is functionally engaged with the right brake shoe 110. Referring to FIG. 8, an arc-shaped groove 322 formed on the forked legs on the left side of the two plates receives a cable end nipple 420 of the brake cable 400. A strut 330, integrally formed from a deformed piece of plate, comprises two facing plate portions connected on their upper edges by a bridge 332 and positioned between the two brake shoes 110, 120. A notched groove 331 formed at the superimposing portion on the left side of the strut 330 in the FIG. 8 is functionally engaged with the left brake shoe 120.

The brake lever 320 is inserted from the opposite side of the bridge 332 into a space formed between the two facing plate portions of the strut 330, and upper right ends of the brake lever 320 is pivotally supported relative to the strut 330 through the lever pin 310 acting as the fulcrum as depicted in FIG. 8.

As is evident from FIG. 8, clockwise rotation of the brake lever 320 with the lever pin 310 is restricted by abutting against the bridge 332 of the strut 330. A guide pipe 500 and the brake cable 400, which act as a remote force transmitting member, pass through the back plate 100 for the purpose of engaging and acting upon the arc-shaped groove 322 as an input force portion of the brake lever 320. The guide pipe 500 is depicted in FIGS. 8–10. The guide pipe 500 is so designed that the overhanging portion 501, integrally formed on the intermediate portion of the guide pipe 500, contacts a back of an anchor seat 202 of the anchor 200. An upper portion of the guide pipe 500 penetrates through a hole on the anchor seat 202 and is projected outwardly from the surface of the anchor seat 202. The projected outwardly end portion is widened in opposite directions as shown in FIG. 8; therefore, the guide pipe 500 is integrated with the anchor 200. The widened end 502 of the guide pipe 500 is designed to be partially widened toward both sides of the brake shoes 110, 120. However, the shape of the projected outwardly end portion is not limited to the partially widened shape depicted in FIG. 8 and may be a widened shape in the direction as long as it can secure a thickness of the supporting portion 201 of the anchor 200 without becoming an obstacle to components of the drum brake device.

The brake cable 400 is comprised of an outer casing 430, an inner cable 410 and so on. A large diameter portion of a casing cap 431, fixed with an end of the outer casing 430, abuts against an outer opening end of the guide pipe 500. A small diameter portion of the casing cap 431 fits into a hole of the guide pipe 500. Then, the brake cable 400 is retained on the guide pipe 500 by a wire spring clip 440. A means to retain the casing cap 431 on the guide pipe 500 may be utilized so long as the casing cap 431 is retained on the guide pipe 500 until the operational end (not shown) of the brake cable 400 is attached on a corresponding member. As an alternative, the casing cap 431 may be press fit into the hole of the guide pipe 500 instead of using the clip 440.

The inner cable 410 is slidably inserted into the outer casing 430, and the top side of the inner cable 410 projected out from the casing cap 431 as shown in FIG. 8. The inner cable 410 is passed through the guide pipe 500, where a pin portion 421 of the cable end nipple 420 is secured on the top end of the inner cable 410, which is connected on the arc-shaped groove 322 of the brake lever 320. A dust boot 411 with bellows is positioned and connected between the casing cap 431 and the cable end nipple 420, performing a water proof function into the outer casing 430. For the purpose of maintaining the lower weight of the drum brake, a relatively lighter plate material is used to form the back plate 100. Then, in order to maintain certain high strength requirements for this particular portion: the central portion of the back plate 100, the portion adjacent to the anchor 200 and the connecting portion thereof, a back plate stiffener 101 is provided at the portion on the back plate 100 and is substantially integrated with the back plate 100 such as by welding.

The back plate 100 and the stiffener 101 are fixed on the brake mounting member 150 (e.g., an axle as a member of stationary part of the vehicle) having almost the same outline of the mounting surface as the stiffner 101 by four instalation bolts 140, 140, 141, 141 and corresponding nuts (not shown in the figure). Each of the two bolts 140, 140 at the anchor 200 side has a serration 142 on its intermediate portion. The serrations 142, 142 are pre-press-forced into installation holes 601, 601 formed on a later-described spacer 600 after passing through the anchor seat 202 of the anchor 200, the back plate 100 and the back plate stiffener 101; therefore the anchor seat 202 is temporary fixed on the back plate 100. The right side of the brake lever 320 and the left side of the strut 330 in FIG. 8 are slidably supported by the bolt heads 143, 143 of the bolts 140, 140. Finally, the anchor 200 will be firmly fixed to the brake mounting member 150 when the nuts (not shown in the figure) are tightly screwed with the bolts 140, 140.

Central portions of the back plate 100 and the stiffener 101 are fixed to the brake mounting member 150 via a bearing hub seat (not shown in the figure). Since the bearing hub seat is not extended to the anchor 200 for the purpose of maintaining the lower weight, the spacer 600 with about the same thickness as the bearing hub seat is placed between the stiffener 101 and the brake mounting member 150. This embodiment illustrates the spacer 600 where the serrations 142, 142 formed on the two bolts 140, 140 are press-forced into the installation holes 601, 601 of the spacer 600 and are pre-integrated in the drum brake.

Brake operation of the above-explained structure is explained below. If the operation side of the inner cable 410 (not shown in the figure) is pulled, the intermediate portion of the curved outer casing 430 tends to be deformed back to a straight. The casing cap 431 is supported by the guide pipe 500 and the other side of the outer casing 430 (not shown in the figure) are supported by the corresponding member in order to prevent this deformation, thereby transmitting the pulling force onto the cable end nipple 420. As the pulling force is transmitted to the arc-shaped groove 322 functioning as the input force portion of the brake lever 320, the brake lever 320 rotates counterclockwise in FIG. 8 with the lever pin 310 to press the brake shoe 110, and that reaction force urges the strut 330 to press the brake shoe 120 via the lever pin 310. If such a pressing force goes beyond a tension of the shoe return springs 160, 160, both brake shoes 110, 120 spread apart at the point of abutment on the adjuster 130, thereby making a frictional engagement with the brake drum, not shown in the figure.

In FIG. 7, as the brake drum (not shown in the figure) rotates clockwise, the brake shoe 110 becomes supported by the supporting portion 201 of the anchor 200, and the brake shoe 120 becomes supported by the adjuster 130, thereby generating a braking force. As the brake drum rotates counterclockwise, the brake shoe 120 becomes supported by the supporting portion 201 of the anchor 200, and the brake shoe 110 becomes supported by the adjuster 130, thereby generating a braking force. Accordingly, both brake shoes 110, 120 have self-servo function even if the brake drum rotates in either direction, i.e., functioning as a duo-servo (DS) type drum brake.

The above-conventional drum brake suffers from the following drawbacks and deficiencies.

The guide pipe 500 is designed so that the overhanging portion 501 contacts the back (the back plate 100 side) of the anchor seat 202 of the anchor 200, and the upper portion of the guide pipe 500 is penetrated through the hole on the anchor seat 202 in FIG. 8. Former projected outwardly end portion is widened. With this structure, an effective stroke of the brake cable 400 is restricted between the lower end surface of the brake lever 320 and the widened end 502 of the guide pipe 500. If the distance (brake off-set) H from the brake mounting surface to the center of the brake shoes 110, 120 in the width direction is small, it becomes difficult to design the layout of the [portion where the] brake cable mounting section and the crank mechanism 300.

The overall length of the guide pipe 500 must be longer, which is another disadvantage when considering the cost.

When in brake operation, the anchor 200 receives the brake force of the brake shoes 110, 120 and the operational reaction force on the outer casing 430 via the guide pipe 500. Therefore, the anchor 200 needs to be stronger which is another disadvantage in considering the weight and cost.

SUMMARY AND OBJECT OF THE INVENTION

This invention improves upon the aforementioned problems in the prior art and provides a brake cable mounting structure for a drum brake, in which even if the distance from the brake mounting surface to the center of the brake shoes in the wide direction is short, designing the layout of the brake cable mounting section and the crank mechanism is facilitated. Further, the load acting on the anchor may be reduced, which eliminates the uncertainty of the anchor strength.

With this invention, a brake cable mounting structure, including a crank mechanism, a brake cable, a pipe member and a part of a back plate adjacent to the crank mechanism, is provided. The crank mechanism is disposed adjacent to a pair of adjacent facing ends of brake shoes moveably mounted on a back plate so as to actuate the brake shoes. The brake cable has an inner cable connected with the input force portion of the crank mechanism and has an outer casing. The pipe member guides the inner cable to pass out of the drum brake. The outer casing is attached to the pipe member. The part of the back plate adjacent to the crank mechanism is fixed on a brake mounting member via a spacer. At that time, the pipe member is integrally formed with the spacer.

With this invention, no projection on the anchor seat projecting toward the crank mechanism side (i.e., widened portion of the guide pipe in the conventional art) is necessary; therefore, the range of the effective stroke of the brake cable is expanded. Accordingly, even if the distance from the brake mounting surface to the brake shoe center in the width direction, i.e., brake off-set, is short, the layout of the brake cable mounting section and the crank mechanism is facilitated.

With this invention, an operational reaction force during the brake operation is supported by the spacer. Hence, the anchor only needs to support the brake force, which enables the anchor to be designed smaller and lighter.

With this invention, when the pipe-like section and anchor are integrated with the spacer, the number of necessary components is reduced, which facilitates handling and the maintenance. When the guide pipe is integrated with the spacer, the entire length of the guide pipe is shortened, thereby reducing the cost of the structure. When the anchor is integrated with the spacer, if the brake force acts in the direction to tumble the anchor, the stiffener side of the spacer portion of this integral forming member abuts and is supported by the mounting surface of the stiffener substantially integrated with the back plate, thereby increasing the durability of the drum brake.

BRIEF DESCRIPTION OF THE DRAWINGS

The above and other objects of the present invention will become readily apparent by reference to the following detailed description when considered in conjunction with the accompanying drawings wherein.

DETAILED DESCRIPTION OF THE INVENTION

Embodiments of this invention are explained with reference to the following figures. Here, the same reference numbers used in FIGS. 7–10 illustrating the conventional structure will be similarly numbered, while the explanation of those components will be omitted.

Figure 1:
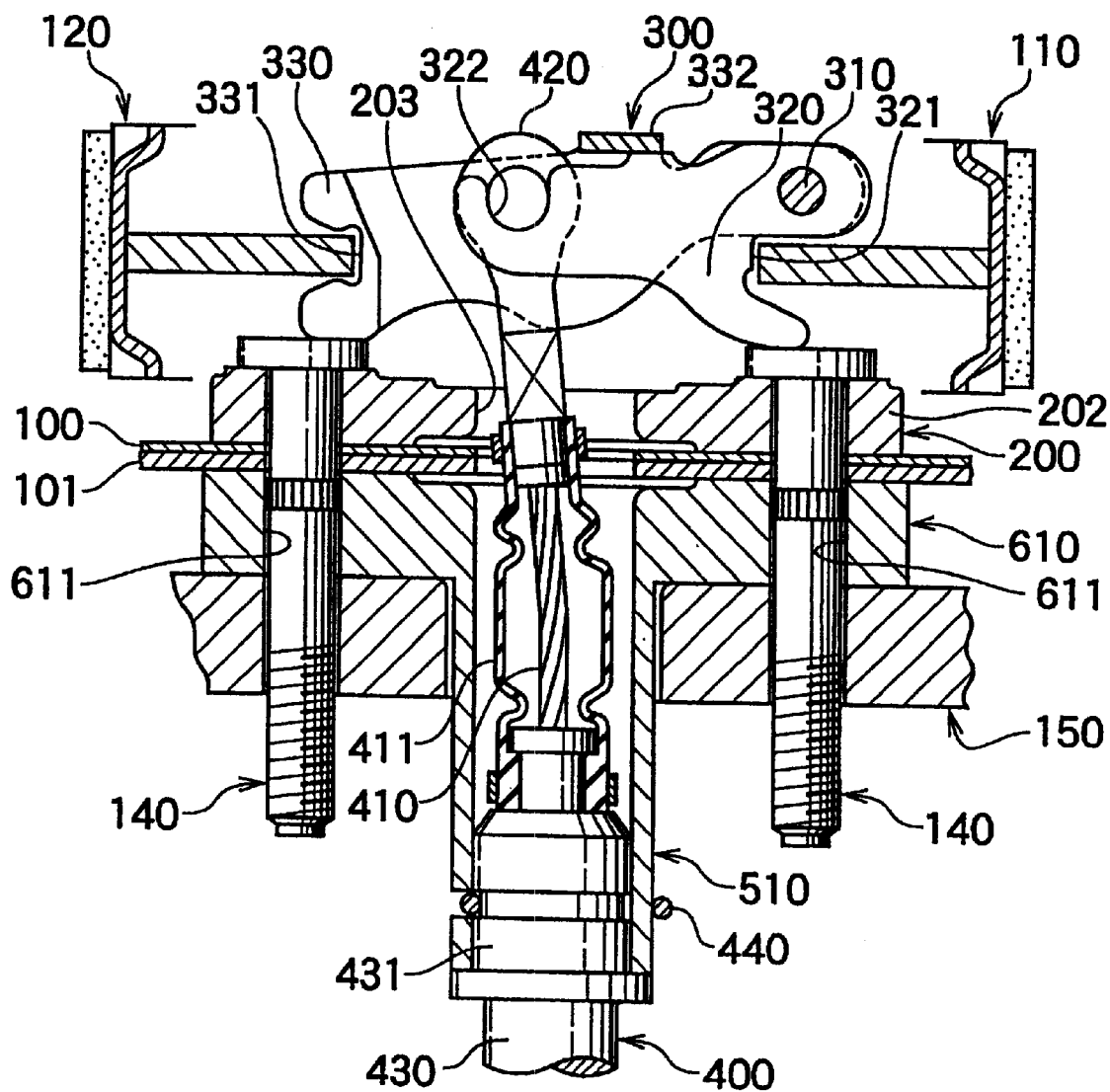
FIG. 1 is an explanation view of the brake actuating part of a First embodiment.

The first embodiment of this invention as shown in FIG. 1 is an example wherein the conventional spacer 600 and the guide pipe 500 are integrated. In this embodiment, the pipe-like section 510 is integrally formed with the spacer 610. Although the pipe-like section 510 may be integrally formed with the spacer 610 by casting, forging, or aluminum die-cast, casting is the preferred method of integrating the pipe-like section 510 taking into account production and cost. There are two bolt installation holes 611, 611 formed on the spacer 610, wherein the respective bolts 140, 140 are press-forced into the installation holes 611, 611 similar to the conventional structure. The number of necessary components for the structure is reduced by integrally producing the pipe-like section 510 and the spacer 610, which facilitates the handling and the management of parts.

The pipe-like section 510 is integrally extended from the end surface of the spacer 610 at the side of the brake mounting member 150, so that the operational reaction force while in the braking operation is supported by the spacer 610 via the pipe-like section 510. Accordingly, the anchor 200 only needs to have a strength to support the brake force, which enables a reduction of the anchor 200 size, thereby lightening the weight of the anchor 200. Further, there is no projection out from the anchor seat 202 of the anchor 200 at the side of the crank mechanism 300. This increases the extent of an effective stroke of the brake cable 400, thereby increasing its applicability when the brake off-set is small.

For the structure of installing the outer casing 430 on the pipe-like section 510 in this invention, the large diameter portion of the casing cap 431 of the outer casing 430 abuts against the outer opening end of the pipe-like section 510 and at the same time the small diameter portion of the casing cap 431 fits into the hole of the pipe-like section 510. The brake cable 400 is then retained on the pipe-like section 510 by the clip 440. However, the brake cable 400 does not come out after properly positioning the other side of the brake cable 400 on the corresponding member. Therefore, the casing cap 431 may be press fit into the hole of the pipe-like section 510 instead of using the clip 440. The diameter of a through hole 203 formed on the anchor seat 202 of the anchor 200 only needs to be just enough to have the cable end nipple 420 and the inner cable 410 pass through thereby further reducing the size of the anchor seat 202.

Figure 2:
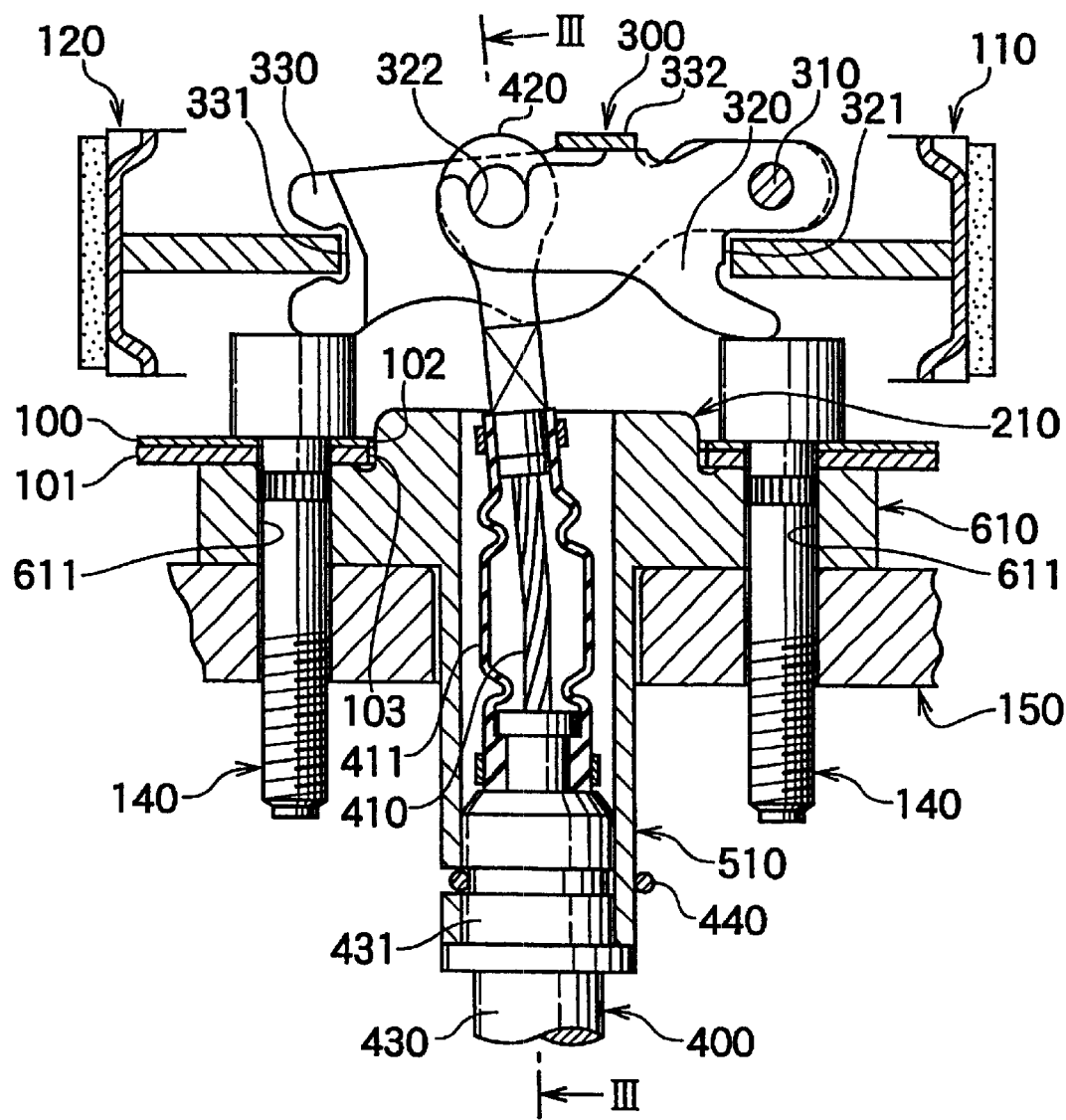
FIG. 2 is an explanation view of the brake actuating part of a Second embodiment.
Figure 3:
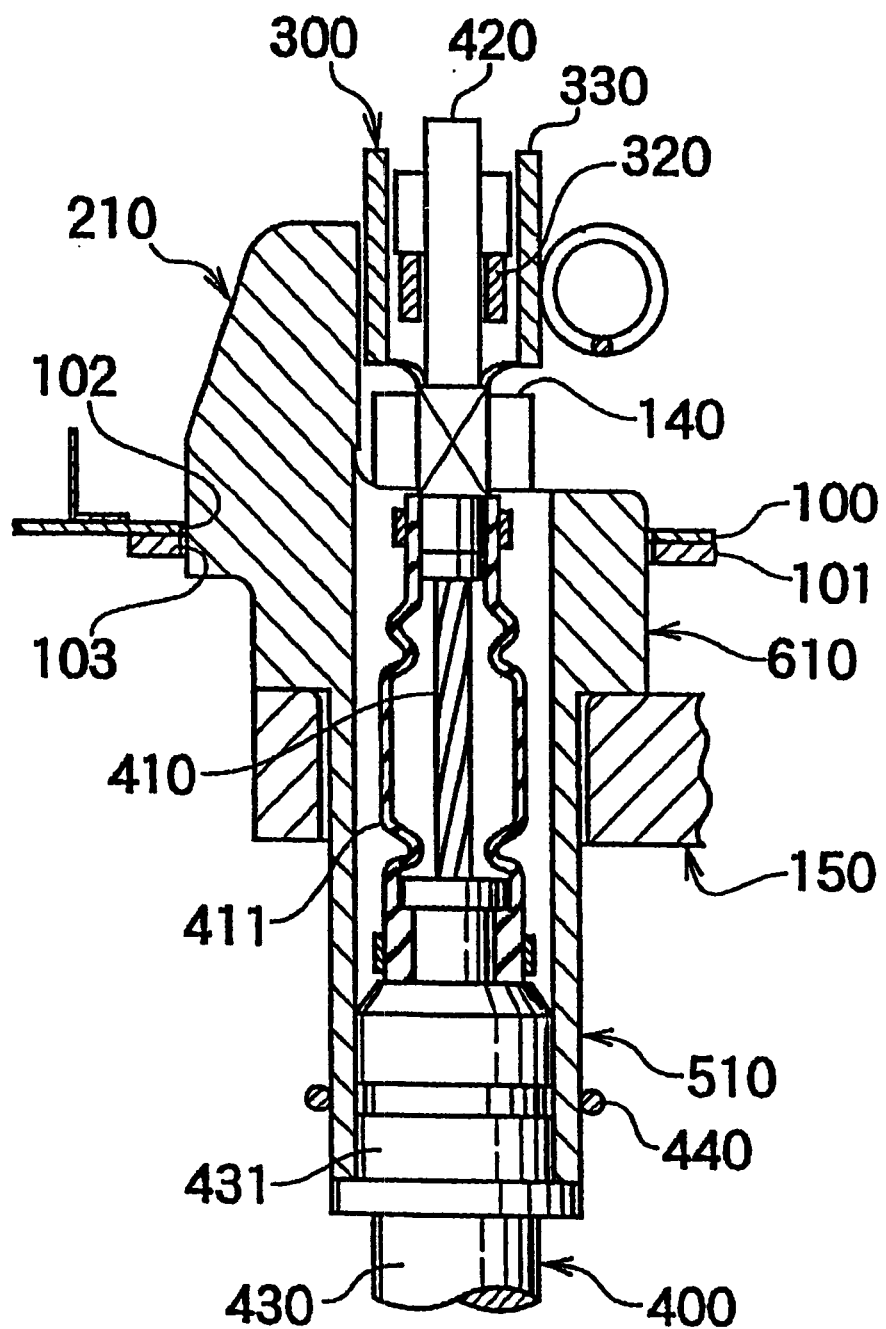
FIG. 3 is a cross-section view of FIG. 2 taken along the line III—III.

Another embodiment is explained below with reference to FIGS. 2 and 3. This second embodiment illustrates the case where the anchor section 210 is integrally formed with the spacer 610 in addition to the pipe-like section 510 as in embodiment 1. The anchor section 210 penetrates through holes 102, 103 of the back plate 100 and the stiffener 101 and is extended to support both brake shoes 110, 120. In the case of this second embodiment, the number of components necessary for the structure is reduced and nearly the same effectiveness as obtained by first embodiment is achieved.

Figure 4:
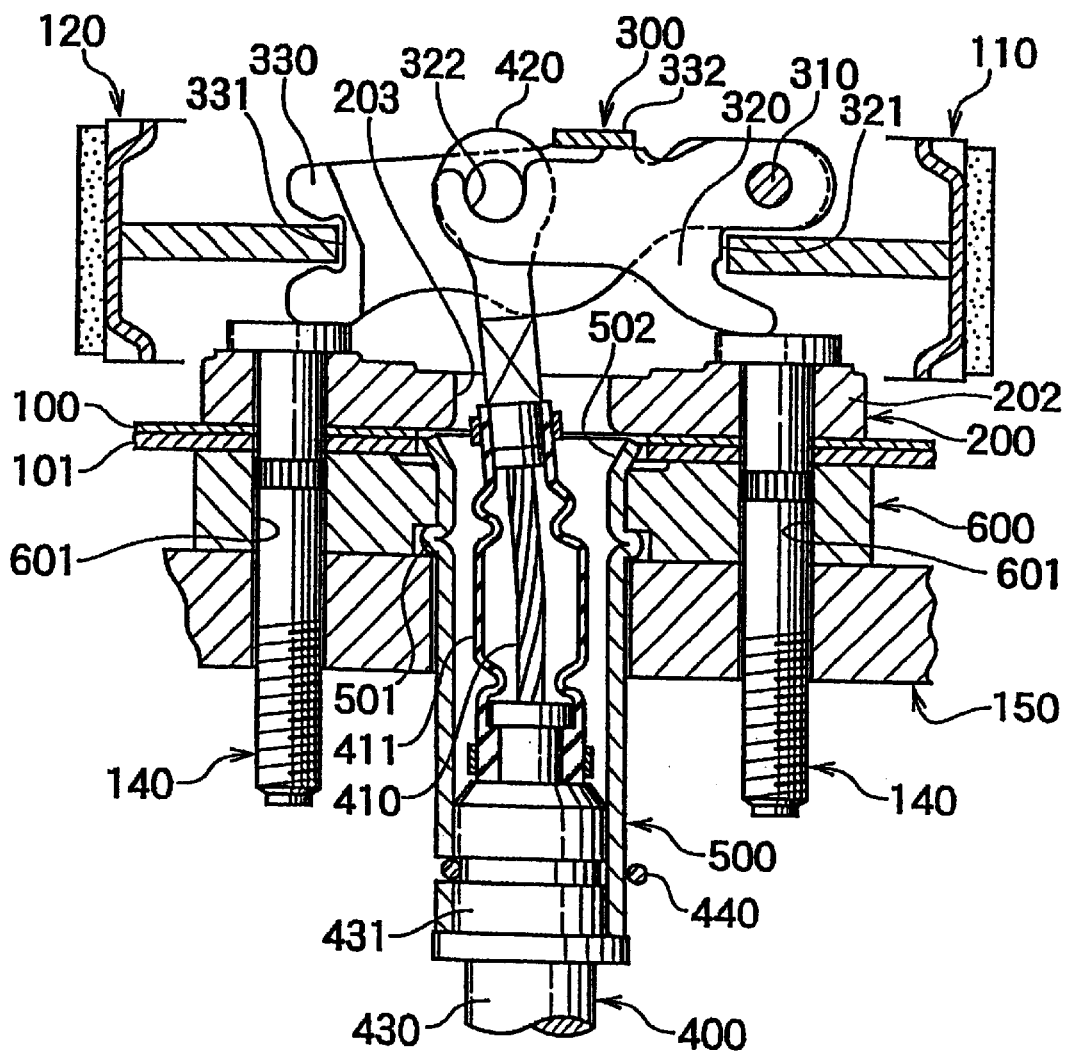
FIG. 4 is an explanation view of the brake actuating part of a Third embodiment.

Further, another embodiment of this invention is explained with reference to FIG. 4. In this third embodiment, the above-described conventional guide pipe 500 is secured with the anchor 200 while the third embodiment illustrates the concept or notion where the guide pipe 500 is integrated with the spacer 600. Further a large diameter overhanging portion formed by welding a washer on the guide pipe 500 and the like and the widened end 502 may be employed instead of the conventional overhanging portion 501 integrally formed on the guide pipe 500 and the widened end 502. Therefore, the guide pipe 500 is integrated with the spacer 600. As the aforementioned first embodiment, this third embodiment enables an increase in the effective stroke of the brake cable 400 and a decrease of the size of the anchor 200.

Figure 5:
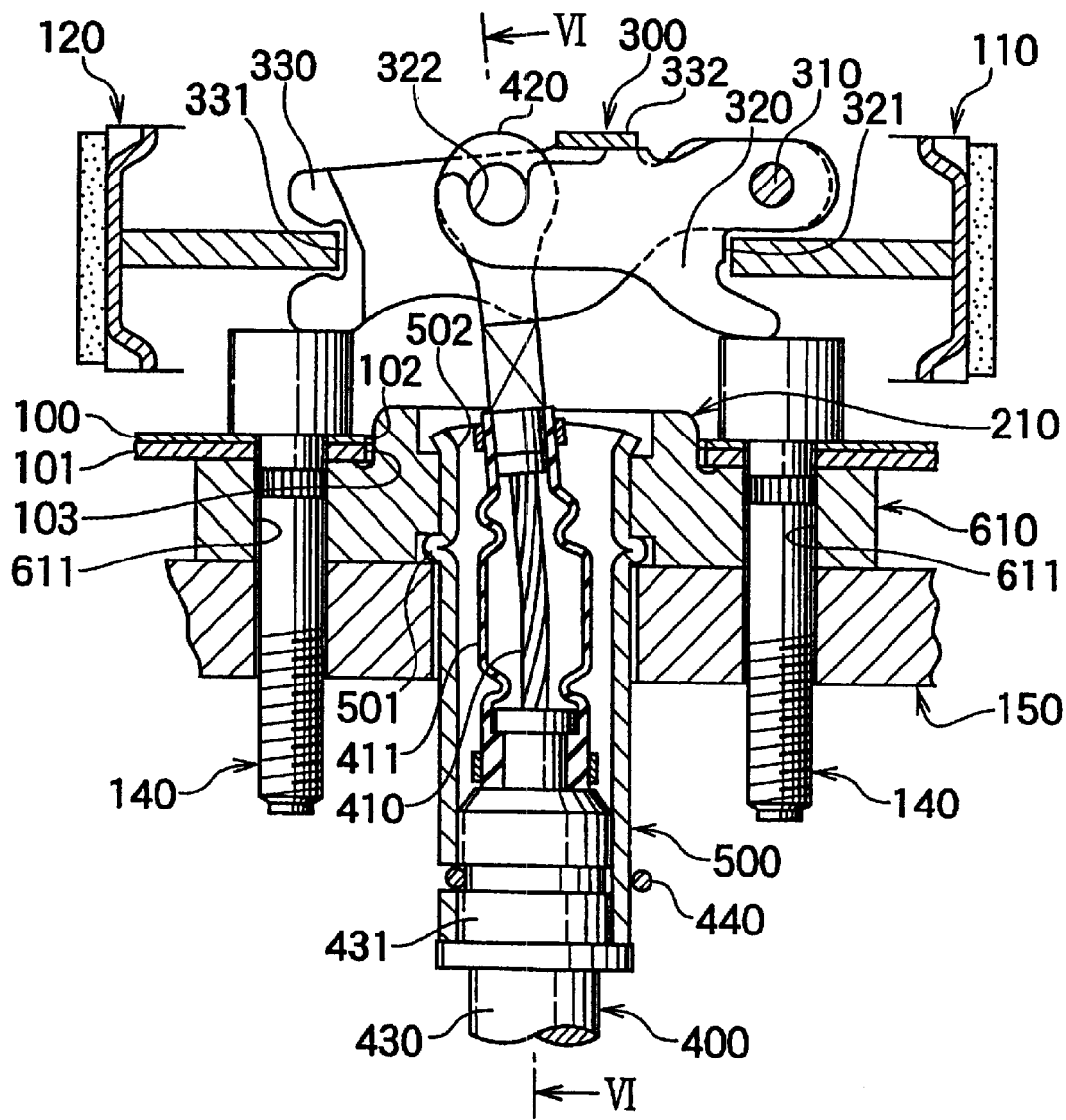
FIG. 5 is an explanation view of the brake actuating part of a Fourth embodiment.
Figure 6:
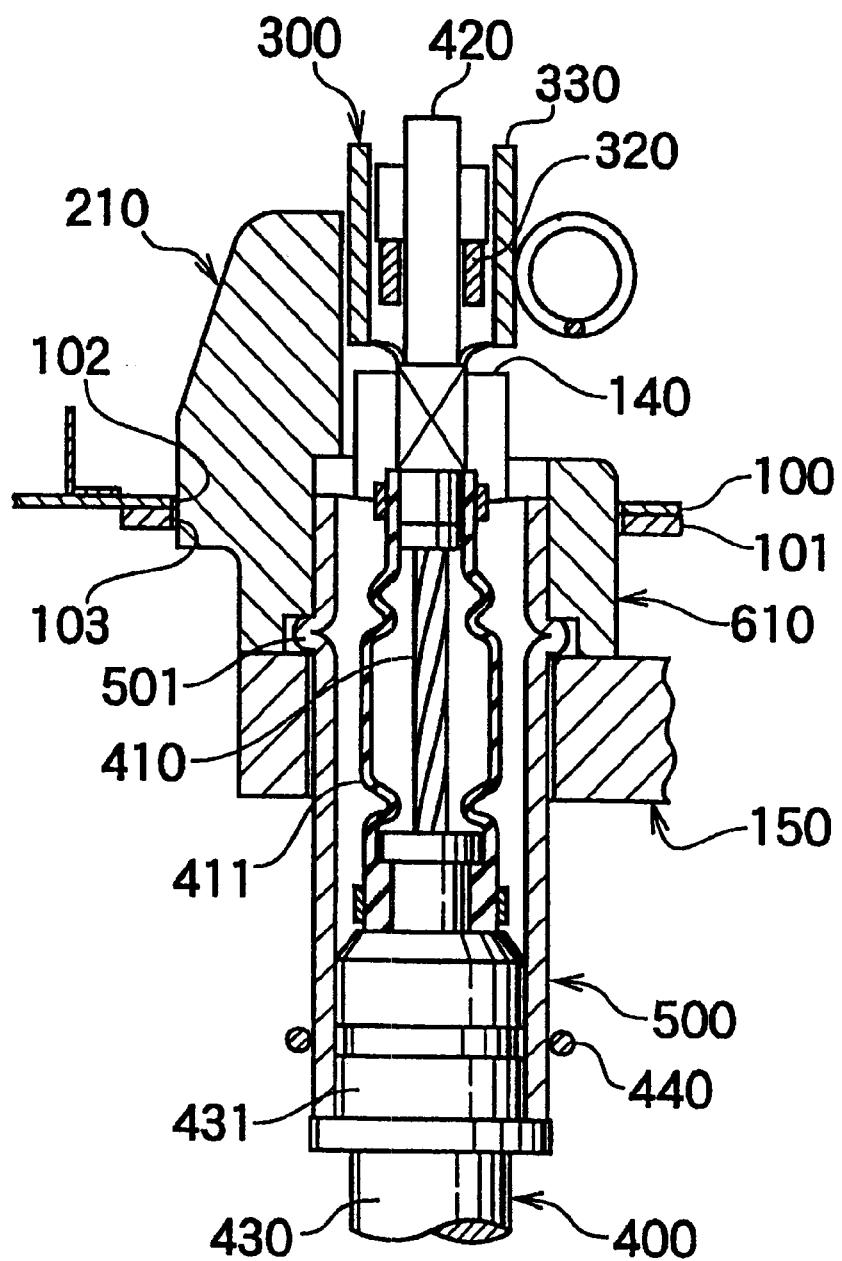
FIG. 6 is a cross-section view of FIG. 5 taken along the line VI—VI.

Further, another embodiment of the invention is explained with reference to FIGS. 5 and 6. The above-described third embodiment illustrates the case where the guide pipe 500 is integrated with the spacer 600 while this fourth embodiment illustrates the case where the guide pipe 500 is integrated with the spacer 610 in which the anchor section 210 is integrally formed. Accordingly, in addition to the advantages of third embodiment, this invention further reduces the number of components necessary.

Figure 7:
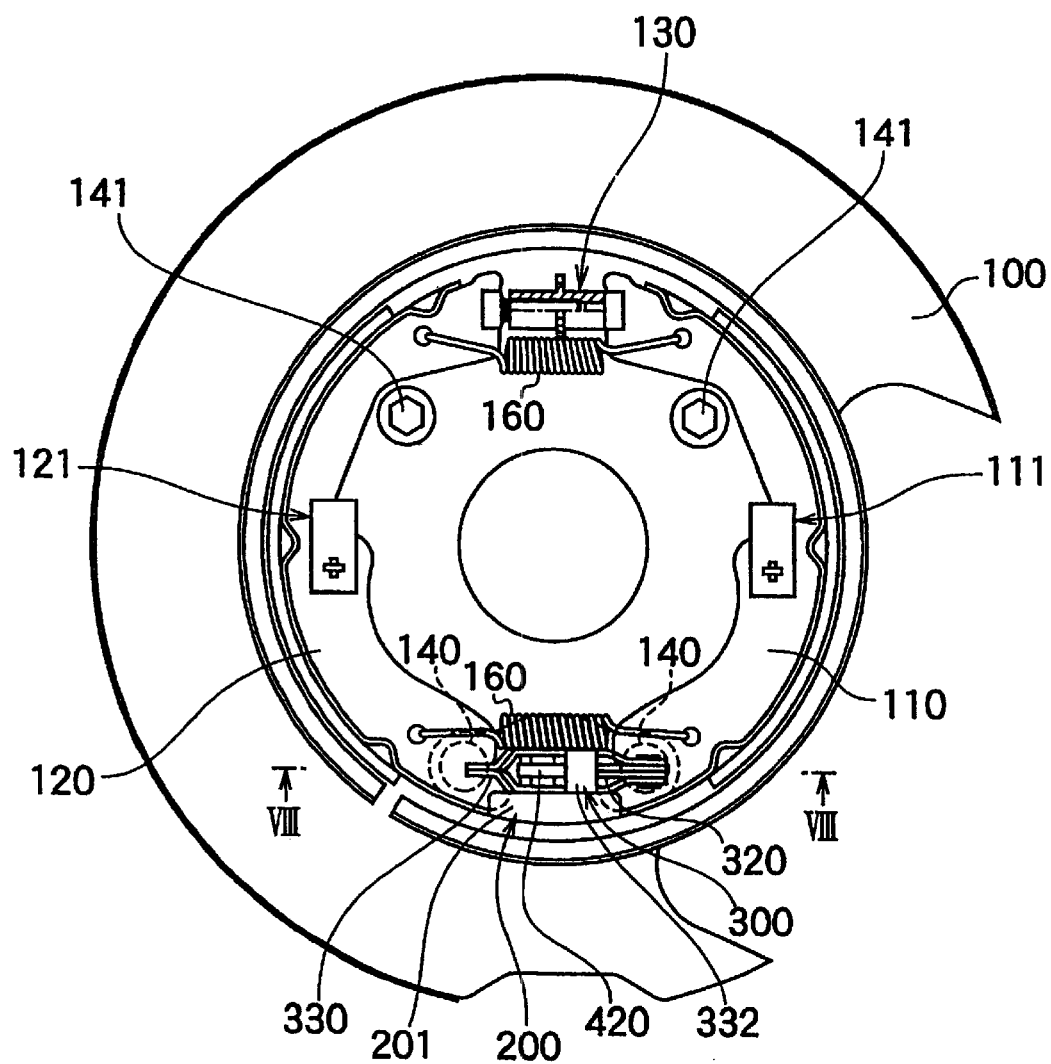
FIG. 7 is a plan view of the conventional drum brake device.
Figure 8:
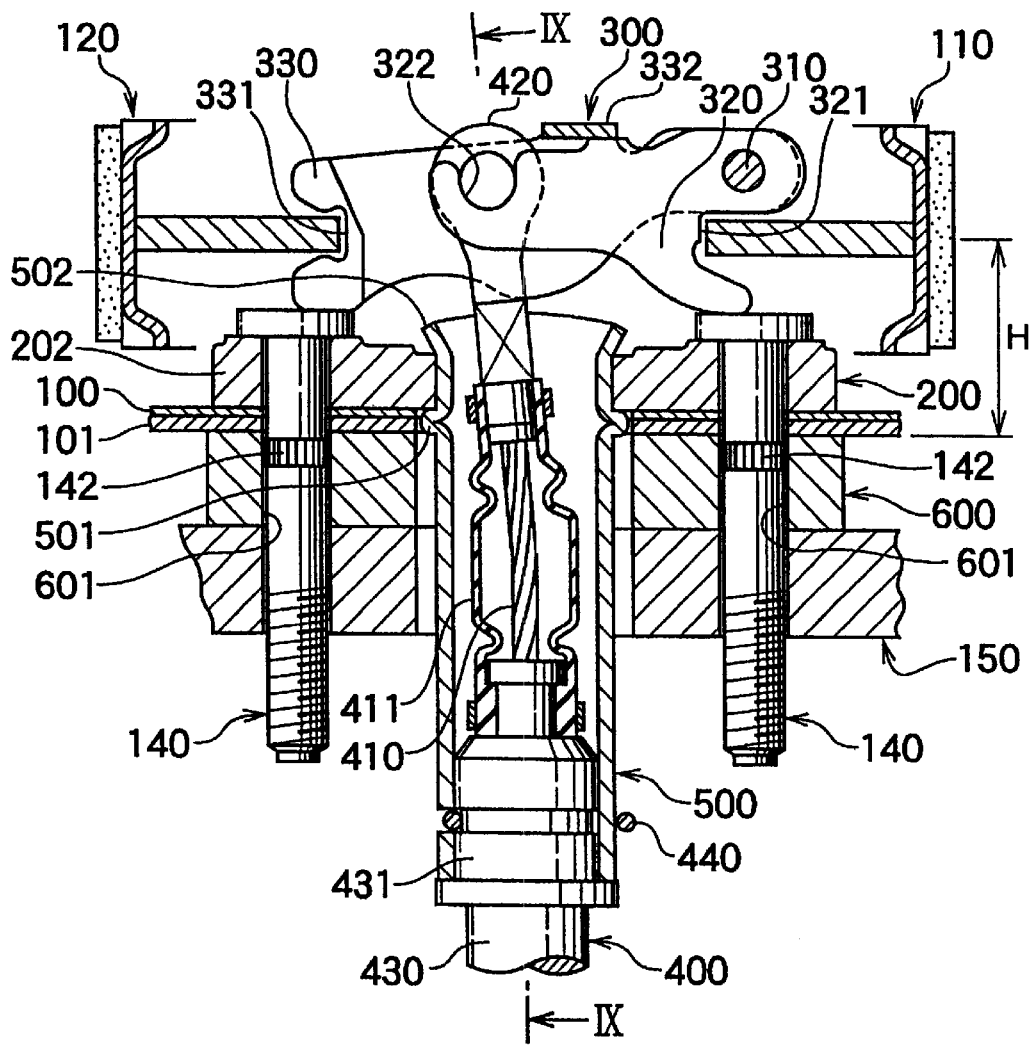
FIG. 8 is a cross-section view of FIG. 7 taken along the line VIII—VIII.
Figure 9:
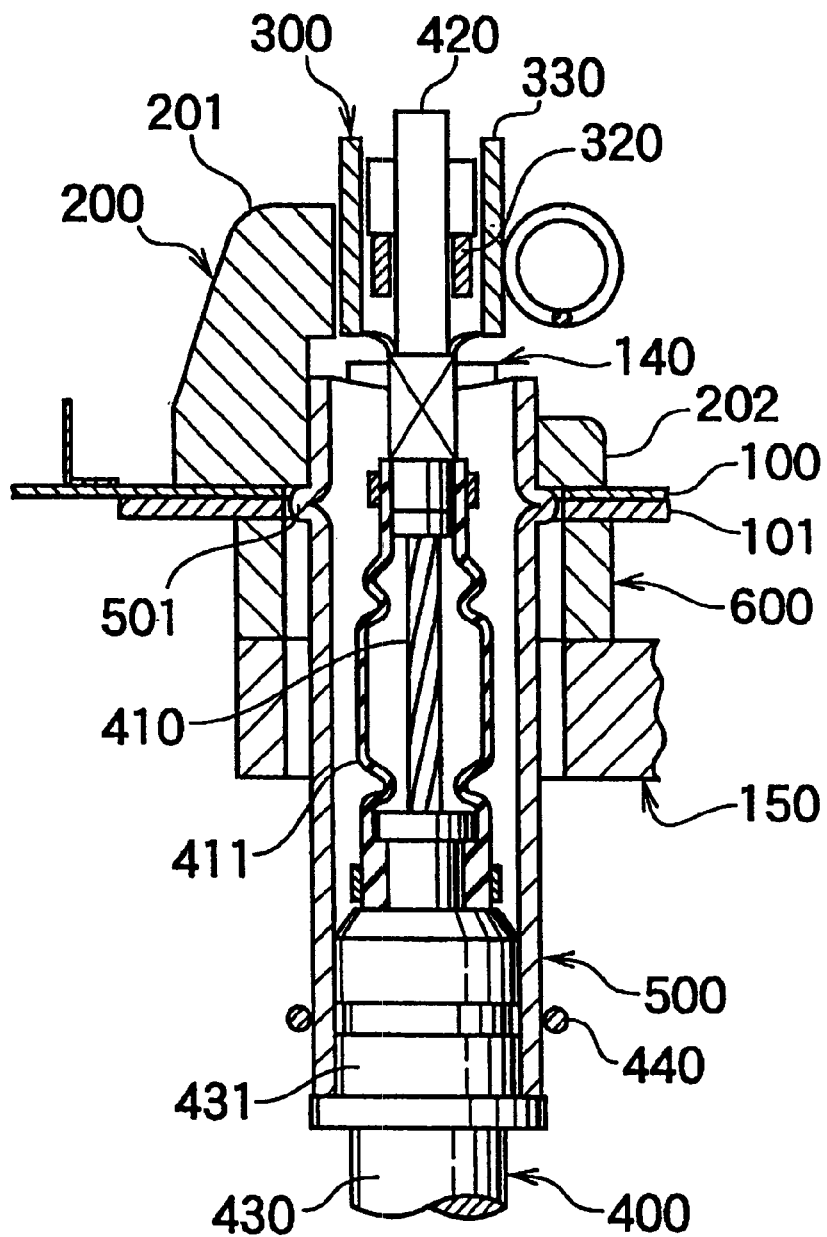
FIG. 9 is a cross-section view of FIG. 9 taken along the line IX—IX.
Figure 10:
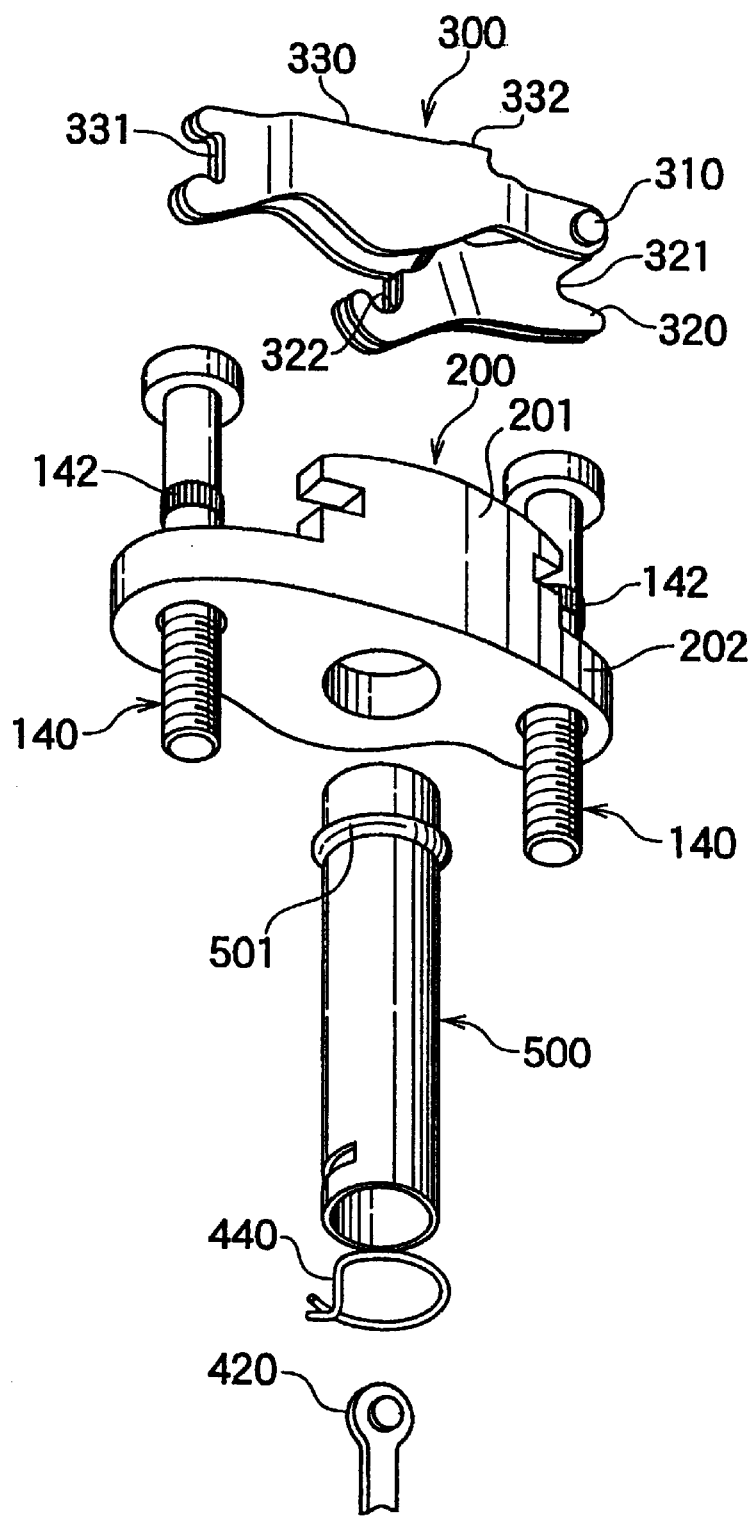
FIG. 10 is an exploded view of the brake actuating part.

Embodiments 1–4 show a brake cable mounting structure for a duo-servo (DS) type drum brake where one adjacent facing end of the pair of brake shoes 110, 120 is supported by the anchor 200, and the other adjacent facing end of the brake shoes 110, 120 is connected via the adjuster 130. However, this invention is not limited to what is described above. For example, it is evident that the brake cable mounting structure of this invention is applicable to a leading trailing (LT) type drum brake where a fixed anchor instead of the adjuster 130 as in the conventional art of FIG. 7 is employed as shown in German Utility Model Publication Number 7116427. As shown in the U.S. Pat. No. 5,720,367, this invention is also applicable to the dual-mode drum brake which functions as a LT type when in service brake operation and functions as a DS type when in parking brake operation. It is sufficient if, at a minimum, the brake cable mounting structure for the drum brake has a crank mechanism 300 and a pipe-like section 510 or guide pipe 500.

Because of the particular structure described above, this invention has the following advantages over the prior art:

No projection on the anchor seat projecting toward the crank mechanism side (i.e., widened portion of the guide pipe in the conventional art) is necessary; therefore, the range of the effective stroke of the brake cable is increased. Accordingly, even if the distance from the brake mounting surface to the brake shoe center in the width direction, i.e., brake off-set, is short, the layout of the brake cable mounting section and the crank mechanism is facilitated.

An operational reaction force during the brake operation is supported by the spacer. Hence, the anchor only needs to support the brake force, which enables the anchor to be designed smaller and lighter.

When the pipe-like section and anchor are integrated with the spacer, the number of components necessary is reduced, which facilitates handling and the maintenance.

When the guide pipe is integrated with the spacer, the entire length of the guide pipe is shortened, thereby reducing the cost of the structure.

When the anchor is integrated with the spacer, if the brake force acts in the direction to tumble the anchor, the stiffener side of the spacer portion of this integral forming member abuts and is supported by the mounting surface of the stiffener substantially integrated with the back plate, thereby increasing the durability of the drum brake.

It is readily apparent that the above-described embodiments have the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A brake cable mounting structure for a drum brake comprising:
   a crank mechanism having an input force portion, said crank mechanism disposed adjacent to a pair of adjacent facing ends of brake shoes movably mounted on a back plate so as to actuate said brake shoes:
   a brake cable having an inner cable and an outer casing, said inner cable connected with said input force portion of said crank mechanism;
   a pipe member for guiding said inner cable to pass out of said drum brake, said outer casing being attached to said pipe member, and
   a part of the back plate adjacent to said crank mechanism fixed on a brake mounting member via a spacer, wherein
   said pipe member and said spacer are formed together in a monoblock by molding.

2. The brake cable mounting structure for a drum brake as claimed in claim 1, wherein an anchor member supporting said adjacent facing ends of said pair of brake shoes is positioned adjacent to said crank mechanism.

3. The brake cable mounting structure for a drum brake as claimed in claim 2, wherein said anchor member is formed into said monoblock.

4. The brake cable mounting structure for a drum brake as claimed in claim 1, wherein said monoblock is formed by casting.

5. The brake cable mounting structure for a drum brake as claimed in claim 1, wherein said monoblock is formed by forging.

6. The brake cable mounting structure for a drum brake as claimed in claim 1, wherein said monoblock is formed by die-casting.

* * * * *